United States Patent
Coppola et al.

(10) Patent No.: US 11,020,888 B2
(45) Date of Patent: Jun. 1, 2021

(54) METHOD OF FORMING AT LEAST ONE CHANNEL WITHIN A SUBSTRATE AND A SYSTEM

(71) Applicant: GM Global Technology Operations LLC, Detroit, MI (US)

(72) Inventors: Anthony M. Coppola, Rochester Hills, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 167 days.

(21) Appl. No.: 16/033,914

(22) Filed: Jul. 12, 2018

(65) Prior Publication Data

US 2020/0016803 A1 Jan. 16, 2020

(51) Int. Cl.
*B29C 45/14* (2006.01)
*B29C 45/44* (2006.01)
*B29L 1/00* (2006.01)

(52) U.S. Cl.
CPC .. *B29C 45/14065* (2013.01); *B29C 45/14467* (2013.01); *B29C 45/14475* (2013.01); *B29C 45/44* (2013.01); *B29C 2045/14147* (2013.01); *B29C 2045/14524* (2013.01); *B29L 2001/00* (2013.01)

(58) Field of Classification Search
None
See application file for complete search history.

(56) References Cited

U.S. PATENT DOCUMENTS

| 3,445,559 | A | * | 5/1969 | Siteman | B29C 45/14467 264/263 |
| 3,571,900 | A | * | 3/1971 | Hardesty | A63B 53/0466 29/416 |
| 8,277,714 | B1 | * | 10/2012 | Blue | B29C 45/14614 264/263 |
| 9,626,536 | B2 | * | 4/2017 | Bladen | A01K 11/004 |
| 2005/0033237 | A1 | | 2/2005 | Fentress et al. | |
| 2019/0168473 | A1 | | 6/2019 | Ellison et al. | |

FOREIGN PATENT DOCUMENTS

EP 2168750 * 3/2010

* cited by examiner

*Primary Examiner* — Edmund H Lee
(74) *Attorney, Agent, or Firm* — Quinn IP Law

(57) ABSTRACT

A method of forming at least one channel within a substrate includes coupling a fitting to a mold, and securing together the fitting and an insert via threads. A system includes a mold configured to form the substrate. The method also includes inserting a component into an opening of the fitting. Part of the component is disposed outside of the opening of the fitting, and the component is utilized to define the at least one channel within the substrate. The method further includes molding at least one material to the component and the insert to form the substrate. Furthermore, the method includes removing the fitting from the insert while the insert remains molded to the substrate.

20 Claims, 5 Drawing Sheets

METHOD OF FORMING AT LEAST ONE CHANNEL WITHIN A SUBSTRATE AND A SYSTEM

INTRODUCTION

The present disclosure relates to vascular channel manufacture. For instance, the presently disclosed method may be used for forming one or more channels within polymers, metals, or composites using deflagration of a sacrificial material or a tube.

SUMMARY

There is a desire to use vascular channel manufacturing in combination with a threaded insert, as described herein.

The present disclosure provides a method of forming at least one channel within a substrate. The method includes coupling a fitting to a mold, and securing together the fitting and an insert via threads. The method also includes inserting a component into an opening of the fitting. Part of the component is disposed outside of the opening of the fitting, and the component is utilized to define the at least one channel within the substrate. The method further includes molding at least one material to the component and the insert to form the substrate. Furthermore, the method includes removing the fitting from the insert while the insert remains molded to the substrate.

The method optionally includes one or more of the following:

A) molding the at least one material to the component and the insert further includes molding the at least one material directly to the component and the insert to form the substrate;

B) inserting the component through a hole of the insert, wherein part of the component is disposed outside of the hole of the insert;

C) removing the component from the hole of the insert;

D) placing a retainer member around the component to maintain a position of the component relative to the fitting and the insert;

E) removing the retainer member from the component after molding the at least one material to the component and the insert;

F) removing the component from the substrate, thereby forming the at least one channel in the substrate;

G) the component is further defined as a sacrificial component, wherein removing the component from the substrate further includes igniting the sacrificial component to cause deflagration of the sacrificial component, thereby forming the at least one channel in the substrate;

H) the component is further defined as a sacrificial component, wherein removing the component from the substrate further includes melting the sacrificial component and removing the melted sacrificial component from the substrate, thereby forming the at least one channel in the substrate;

I) the fitting is further defined as a pin having a head and the opening of the pin is closed at one end of the pin;

J) coupling the fitting to the mold further includes threading the pin to threads of the mold;

K) inserting the component into the opening of the fitting further includes inserting the component into the opening of the pin;

L) securing together the fitting and the insert via the threads further includes securing together the pin and the insert via the threads;

M) securing together the pin and the insert via the threads occurs after threading the pin to the threads of the mold;

N) inserting the component through a hole of the insert, wherein part of the component is disposed outside of the hole of the insert;

O) inserting the component into the opening of the pin occurs before inserting the component through the hole of the insert;

P) placing a retainer member around the component to maintain a position of the component relative to the pin and the insert;

Q) placing the retainer member around the component occurs before molding the at least one material to the component and the insert;

R) unscrewing the pin from the mold via the head;

S) unscrewing the pin from the mold occurs after molding the at least one material to the component and the insert;

T) removing the fitting from the insert while the insert remains molded to the substrate further includes unscrewing the pin from the insert via the head;

U) removing the component from the hole of the insert and the substrate, thereby forming the at least one channel in the substrate;

V) removing the component from the hole of the insert and the substrate occurs after unscrewing the pin from the mold and unscrewing the pin from the insert;

W) coupling a ball-lock pin to the mold;

X) coupling the fitting to the mold further includes coupling the ball-lock pin to the fitting via at least one recess of the fitting;

Y) coupling the ball-lock pin to the fitting occurs after coupling the ball-lock pin to the mold;

Z) inserting the component through a hole of the insert, wherein part of the component is disposed outside of the hole of the insert;

AA) inserting the component through the hole of the insert and inserting the component into the opening of the fitting occurs before coupling the ball-lock pin to the fitting;

BB) placing the retainer member around the component occurs before inserting the component through the hole of the insert and the opening of the fitting;

CC) removing the fitting from the insert while the insert remains molded to the substrate further includes unscrewing the fitting from the insert via at least one slot of the fitting;

DD) unscrewing the fitting from the insert occurs after molding the at least one material to the component and the insert;

EE) removing the retainer member from the component after molding the at least one material to the component and the insert;

FF) removing the component from the hole of the insert and the substrate occurs after unscrewing the fitting from the insert;

GG) the component is further defined as a tube;

HH) inserting the component into the opening of the fitting further includes inserting the tube into the opening of the fitting;

II) molding the at least one material to the component and the insert further includes molding the at least one material to the tube and the insert to form the substrate, and the tube remains molded to the substrate to form the at least one channel in the substrate;

JJ) inserting the tube through a hole of the insert, wherein part of the tube is disposed outside of the hole of the insert;

KK) placing a retainer member around the tube to maintain a position of the tube relative to the fitting and the insert;

LL) placing the retainer member around the tube occurs before molding the at least one material to the component and the insert;

MM) removing the fitting from the insert while the insert remains molded to the substrate further includes unscrewing the fitting from the insert;

NN) unscrewing the fitting from the insert occurs after molding the at least one material to the tube and the insert; and OO) removing the retainer member from the tube after molding the at least one material to the tube and the insert.

The present disclosure also provides a system including a mold configured to form a substrate. The system also includes a fitting coupled to the mold, and the fitting defines an opening. The system further includes an insert and the fitting secured together via threads. Furthermore, the system includes a component inserted into the opening of the fitting. Part of the component is disposed outside of the opening of the fitting, and the component is utilized to define at least one channel within the substrate. The component and the insert are disposed inside the mold. At least one material is disposed inside the mold to form the substrate secured to the component and the insert. The fitting is removed from the insert while the insert remains molded to the substrate.

The system optionally includes one or more of the following:

A) the insert defines a hole, wherein part of the component is disposed in the hole of the insert and another part of the component is disposed outside of the hole of the insert;

B) a retainer member disposed around the component to maintain a position of the component relative to the fitting and the insert;

C) the component is further defined as a sacrificial component, wherein the sacrificial component is ignited to cause deflagration of the sacrificial component, thereby forming the at least one channel in the substrate;

D) the component is further defined as a sacrificial component, wherein the sacrificial component is melted to remove from the substrate, thereby forming the at least one channel in the substrate;

E) the fitting is further defined as a pin having a head and the opening of the pin is closed at one end of the pin, wherein part of the component is disposed in the opening of the pin;

F) the mold includes threads and the pin includes threads complementary to the threads of the mold, wherein the pin and the mold are threaded together via the threads of the pin and the threads of the mold;

G) the insert includes threads complementary to the threads of the pin, wherein the pin and the insert are threaded together via the threads of the pin and the threads of the insert;

H) a retainer member disposed around the component to maintain a position of the component relative to the pin and the insert;

I) a ball-lock pin coupled to the mold;

J) the insert includes threads and the fitting includes threads complementary to the threads of the insert, wherein the fitting and the insert are threaded together via the threads of the fitting and the threads of the insert;

K) the fitting defines at least one recess, and the ball-lock pin is coupled to the fitting via the at least one recess;

L) the fitting defines at least one slot configured to remove the fitting from the insert while the insert remains molded to the substrate;

M) the component is further defined as a tube, wherein part of the tube is disposed in the opening of the fitting, and the tube remains molded to the substrate to form the at least one channel in the substrate;

N) the insert defines a hole, wherein part of the tube is disposed in the hole of the insert and another part of the tube is disposed outside of the hole of the insert, and O) a retainer member disposed around the tube to maintain a position of the tube relative to the fitting and the insert.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Referring to the FIGS., wherein like numerals indicate like or corresponding parts throughout the several views, the present disclosure describes a system and a method of forming at least one channel 10 within a substrate 12. It is to be appreciated that more than one channel 10 may be formed within the substrate 12. The channel(s) 10 formed in the substrate 12 may be produced via a vascular manufacturing process or system, which is detailed below.

Figure 3:
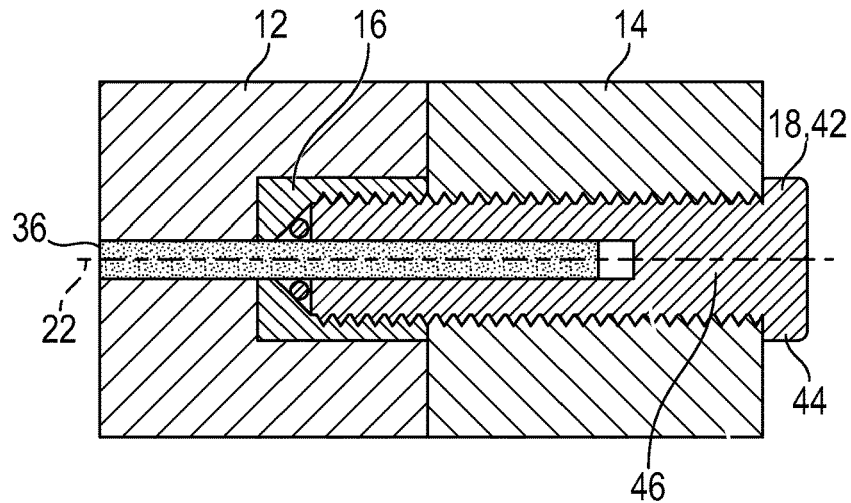
FIG. 3 is a schematic cross-sectional view of a substrate formed in the mold of FIG. 1.
Figure 4:
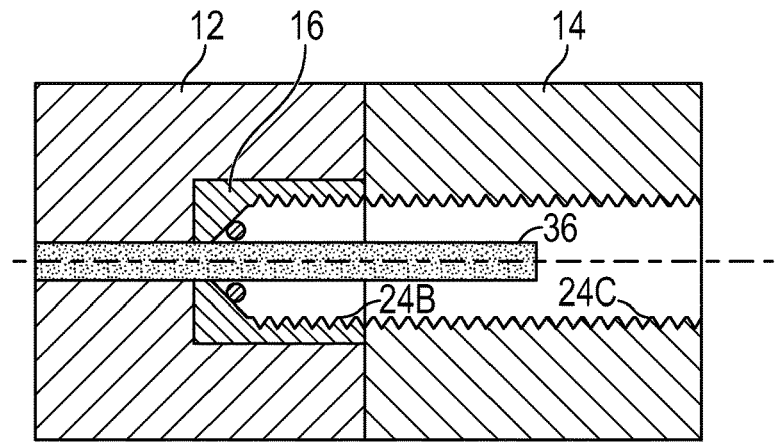
FIG. 4 is a schematic cross-sectional view of the fitting removed from the mold after forming the substrate.
Figure 14:
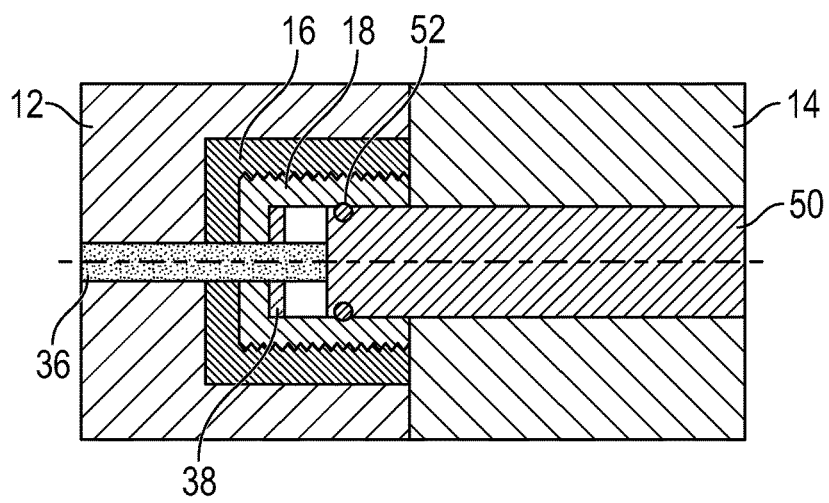
FIG. 14 is a schematic cross-sectional view of the substrate formed in the mold of FIG. 12.

A system includes a mold 14 configured to form the substrate 12 (see FIGS. 3 and 14). The substrate 12 may be utilized in a vehicle application, or alternatively, the substrate 12 may be utilized in non-vehicle applications. Non-limiting examples of vehicle applications include a motor vehicle as shown, or marine vehicle, aerospace vehicle, robot, farm equipment or other movable platform. Non-limiting examples of non-vehicle applications include a stationary power plant, machines, farm equipment, etc. Furthermore, non-limiting examples of the type of molding that are suitable for the system and the method herein, includes compression molding, injection molding, casting, transfer molding, reaction injection molding, resin transfer molding, prepreg molding, hand-layup, vacuum bag molding, etc.

The one or more channels 10 in the substrate 12 described herein may be utilized to guide a fluid, such as a liquid or a gas, through various components, such as power electronics, cooled potted electronics, an engine control unit, touch screen on an instrument, biomedical implants, battery enclosures cooling fins, internal combustion engines, motors, transmissions, transmission lines, fluid line connectors, cooling systems, etc.

To form the substrate 12, the system includes an insert 16 (see FIGS. 2 and 10) coupled to the mold 14. As discussed further below, the insert 16 is secured to the substrate 12 to define a part that is assembled to, for example, the vehicle. The insert 16 may be utilized as a port, such as an inlet or an outlet, for the vascular system without the need to perform a post-molding operation such as machining the port, thereby reducing manufacturing costs. The insert 16 may be formed of any suitable materials, and non-limiting examples may include a polymer, a metal, combinations thereof, etc. Different ways to secure the insert 16 to the substrate 12 are discussed herein.

Figure 1:
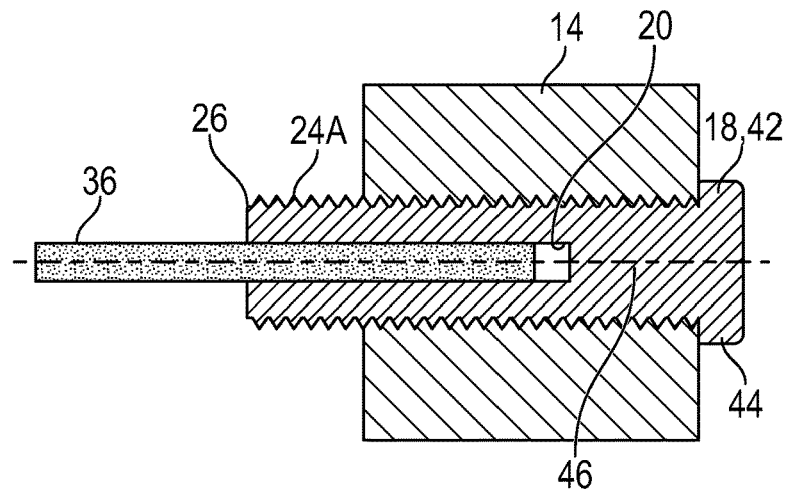
FIG. 1 is a schematic cross-sectional view of a mold, a fitting and a component before forming a substrate.

To position the insert 16 in a desirable location relative to the mold 14, the system includes a fitting 18 (see FIGS. 2 and 12) coupled to the mold 14, and the fitting 18 defines an opening 20. The opening 20 of the fitting 18 may be disposed along a first axis 22. Furthermore, the fitting 18 includes threads 24A. Additionally, the fitting 18 may include an outside surface 26 (see FIGS. 1 and 10) spaced from the opening 20, and the outside surface 26 may face away from the first axis 22. The threads 24A may be disposed on the outside surface 26 of the fitting 18.

Figure 2:
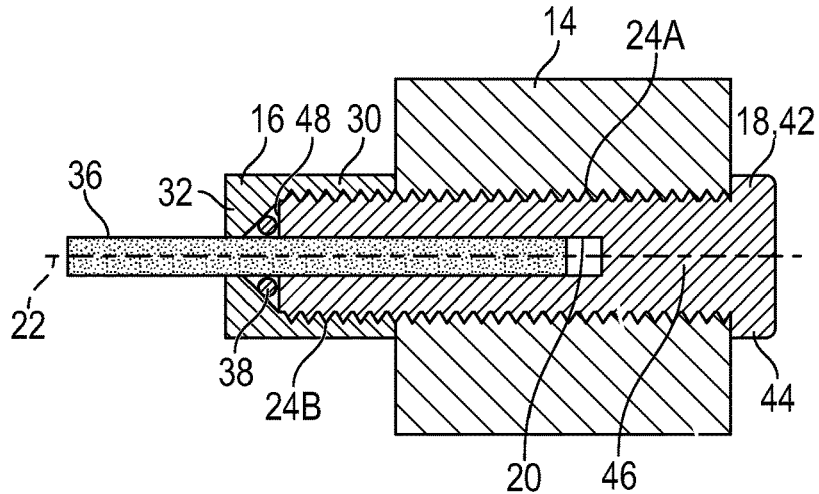
FIG. 2 is a schematic cross-sectional view of an insert threaded to the fitting before forming the substrate.
Figure 10:
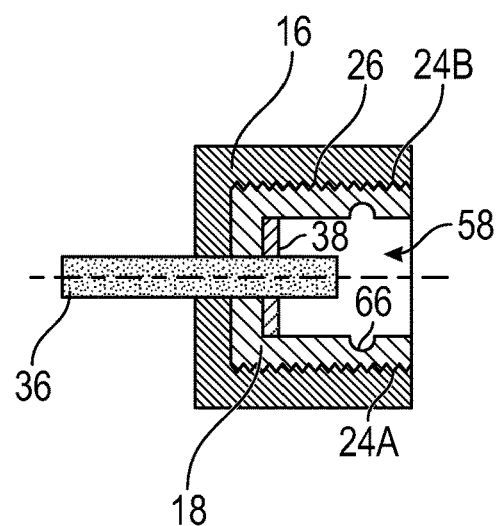
FIG. 10 is a schematic cross-sectional view of the component and the retainer member of FIG. 9 with another fitting and another insert before forming the substrate.
Figure 11:
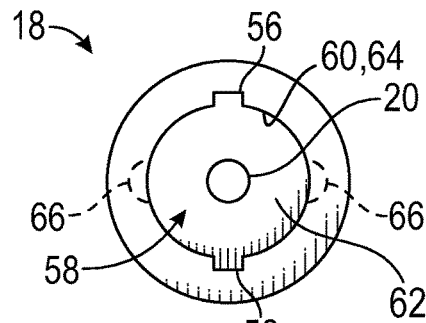
FIG. 11 is a schematic end view of the fitting of FIG. 10.

Turning back to the insert 16 of FIGS. 2 and 10, the insert 16 includes threads 24B. Hence, the insert 16 is pre-threaded so no post-molding operations are needed to use the insert 16 as the port. By pre-threading the insert 16, thread strength may be increased as compared to having to machine threads in a post-molding operation.

Figure 5:
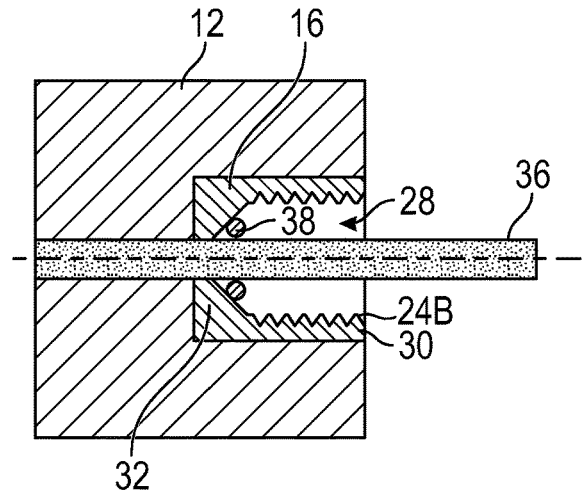
FIG. 5 is a schematic cross-sectional view of the substrate removed from the mold.
Figure 17:
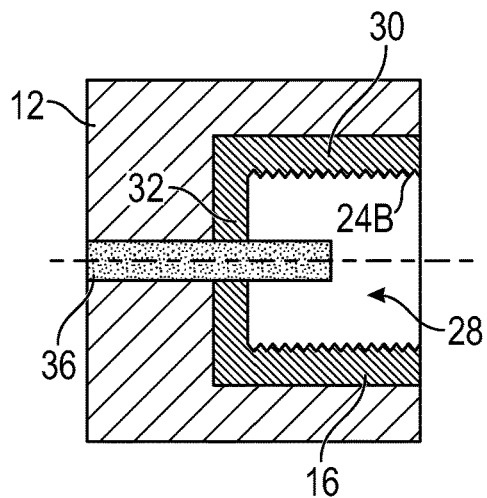
FIG. 17 is a schematic cross-sectional view of the fitting removed from the mold after forming the substrate.

The insert 16 may also define a cavity 28 (FIGS. 5 and 17) configured to receive at least part of the fitting 18. In preparation of securing the insert 16 to the substrate 12, the insert 16 and the fitting 18 are secured together via the threads 24A, 24B. More specifically, the insert 16 may include a side wall 30 that surrounds the cavity 28, and the threads 24B may be disposed on the side wall 30 facing inwardly toward the cavity 28.

The insert 16 may also include a back wall 32 transverse to the side wall 30. Depending on the desired application, the back wall 32 may be different configurations. In certain embodiments, the back wall 32 may be angled or tapered (see, for example, FIGS. 2 and 3). In other embodiments, the back wall 32 may be flat (see, for example, FIGS. 10 and 12).

Furthermore, the insert 16 may define a hole 34. More specifically, the hole 34 is defined by the back wall 32. In certain embodiments, the hole 34 of the insert 16 may align with the opening 20 of the fitting 18. Therefore, in certain embodiments, the hole 34 of the insert 16 is disposed along the first axis 22. Furthermore, in various embodiments, the hole 34 of the insert 16 and the opening 20 of the fitting 18 may be coaxial with each other.

Additionally, it is desirable to define the at least one channel 10 within the substrate 12. To form the channel(s) 10, the system includes a component 36 that is inserted into the opening 20 of the fitting 18. Part of the component 36 is disposed outside of the opening 20 of the fitting 18, and part of the component 36 may be disposed in the opening 20 of the fitting 18. In addition, part of the component 36 is disposed in the hole 34 of the insert 16 and another part of the component 36 may be disposed outside of the hole 34 of the insert 16. Part of the component 36 is disposed outside of the insert 16 to secure at least some of that part of the component 36 to the substrate 12. Additionally, some of the component 36 may be disposed outside of the substrate 12 for removal of the component 36 during another process.

Figure 7:
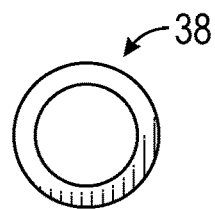
FIG. 7 is a schematic end view of a retainer member.
Figure 8:
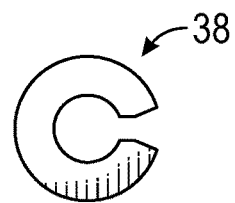
FIG. 8 is a schematic end view of another retainer member.

It is also desirable to retain a position of the component 36 relative to the insert 16 and/or the fitting 18. As such, the system may include a retainer member 38 disposed around the component 36 to maintain a position of the component 36 relative to the fitting 18 and the insert 16. The retainer may be any suitable configuration, and non-limiting examples may include an o-ring (see FIG. 7), a clip (see FIG. 8), a disc, a seal, a gasket, etc.

As mentioned above, the component 36 is utilized to define the at least one channel 10 within the substrate 12. The component 36 and the insert 16 are disposed inside the mold 14, and at least one material is disposed inside the mold 14 to form the substrate 12 secured to the component 36 and the insert 16. The material that forms the substrate 12 may be a resin that is disposed inside the mold 14, etc. Non-limiting examples of the material may include one or more polymer(s), combinations thereof, etc.

Once the material cures, hardens, etc., the insert 16 and the component 36 are secured to the substrate 12, and the substrate 12 is ready to be removed from the mold 14. To do so, the fitting 18 is removed from the insert 16 while the insert 16 remains molded to the substrate 12, and the retainer member 38 is removed from the insert 16 while the insert 16 remains molded to the substrate 12. Also, depending on the configuration of the component 36, it may be desirable to remove the component 36 to form the at least one channel 10.

If the component 36 is a tube 40 (shown in phantom lines in FIGS. 6 and 18), as discussed further below, nothing else is needed to form the channel(s) 10 because the tube 40 already has the channel 10 therein. As such, when utilizing the tube 40, the tube 40 remains secured to the substrate 12 and the insert 16 to define the part that is assembled to, for example, the vehicle. The tube 40 is molded directly or indirectly to the substrate 12 at a processing temperature that is less than the flash point or melting point of the tube 40 to avoid changes to the channel 10 through the tube 40 during the manufacturing process. The term "processing temperature" means a temperature required to perform a manufacturing operation, such as molding or casting. For example, the processing temperature may be the melting temperature of the material forming the substrate 12 (e.g., the melting temperature of the polymeric resin forming the substrate 12).

If the component 36 is removed from the substrate 12 to form the at least one channel 10, then, in certain embodiments, the component 36 is further defined as a sacrificial component. Any suitable sacrificial component may be utilized, and non-limiting examples are discussed below. Furthermore, the sacrificial component may be ignited or burned, melted, decomposed, dissolved, manually extracted from the channel 10, etc., as non-limiting examples, and some of these methods are discussed further below.

The sacrificial component may be ignited to cause deflagration of the sacrificial component, thereby forming the at least one channel 10 in the substrate 12. For example, a portion of the sacrificial component may be ignited to deflag the sacrificial component. It is contemplated that the sacrificial component may be self-oxidizing to burn in a small diameter along long channels 10, and thus the sacrificial component may include a combustible material. The sacrificial component may also be resistant to molding pressures. Further, the sacrificial component is shelf stable and stable during manufacturing (e.g., the flash point is greater than the manufacturing or processing temperature). The term "flash point" means the lowest temperature at which vapors of the combustible material will ignite, when given an ignition source. The sacrificial component is molded directly or indirectly to the substrate 12 at a processing temperature that is less than the flash point of the combustible material to avoid deflagration during the manufacturing process. The term "processing temperature" means a temperature required to perform a manufacturing operation, such as molding or casting. For example, the processing temperature may be the melting temperature of the material forming the substrate 12 (e.g., the melting temperature of the polymeric resin forming the substrate 12). The sacrificial component is wholly or partly made of the combustible material. To achieve the desired properties mentioned above, the combustible material may be black powder (i.e., a mixture of sulfur, charcoal, and potassium nitrate). To achieve the desired properties mentioned above, the combustible material may alternatively or additionally be pentaerythritol tetranitrate, combustible metals, combustible oxides, thermites, nitrocellulose, pyrocellulose, flash powders, and/or smokeless powder. Non-combustible materials could be added to the sacrificial component to tune speed and heat generation. To tune speed and heat generation, suitable non-combustible materials for the sacrificial component include, but are not limited to, glass beads, glass bubbles, and/or polymer particles.

In other embodiments, the sacrificial component may be melted to remove the sacrificial component from the substrate 12, thereby forming the at least one channel 10 in the substrate 12. For example, the sacrificial component may be heated to melt the sacrificial component. Therefore, the sacrificial component may include a meltable material. The sacrificial component is molded directly to the substrate 12 at a processing temperature that is less than a melting point of the meltable material. The term "melting point" means the lowest temperature at which the meltable material will melt, when given a heat source. The sacrificial component may also be resistant to molding pressures. Further, the sacrificial component is shelf stable and stable during manufacturing (i.e., the flash point is greater than the manufacturing or processing temperature). Non-limiting examples of the meltable material may include one or more of polymer(s), glass fiber(s), metal(s), composite(s), etc.

Optionally, the sacrificial component may include a protective shell that surrounds the material(s) that are ignited and/or melted, to contain the burning and/or melting, which may be non-soluble material in combustible resin (e.g., epoxy, polyurethane, polyester, among others) in order to be shelf stable and stable during manufacturing. Also, this protective material is impermeable to the resin and moisture. The protective material has sufficient structural stability to be integrated into a fiber textiling and preforming process. The protective material has sufficient strength and flexibility to survive the fiber preform process. To achieve the desirable properties mentioned above, the protective material may include, for example, braided fibrous material, such as glass fiber, aramid fiber, carbon fiber, and/or natural fiber, infused with an infusion material such as a polymer or wax, oil, a combination thereof or similar material. To achieve the desirable properties mentioned above, the infused polymer may be, for example, polyimide, polytetrafluoroethylene (PTFE), high-density polyethylene (HDPE), polyphenylene sulfide (PPS), polyphthalamide (PPA), polyamides (PA), polypropylene, nitrocellulose, phenolic, polyester, epoxy, polylactic acid, bismaleimides, silicone, acrylonitrile butadiene styrene, polyethylene, polycarbonate, elastomers, polyurethane, polyvinylidene chloride (PVDC), polyvinyl chloride (PVC), polystyrene (PS) a combination thereof, or any other suitable plastic. Suitable elastomers include, but are not limited to, natural polyisoprene, synthetic polyisoprene, polybutadiene (BR), chloroprene rubber (CR), butyl rubber, styrene-butadiene rubber, nitrile rubber, ethylene propylene rubber, epichlorohydrin rubber (ECO), polyacrylic rubber, fluorosilicone rubber, perfluoroelastomers, polyether block amides, chlorosulfonated polyethylene, ethylene-vinyl acetate, shellac resin, nitrocellulose lacquer, epoxy resin, alkyd, polyurethane, etc.

The above discussion applies to all of the embodiments discussed herein, with the component 36 being selected (the ignited type, the melted type, the dissolved type, the decomposed type, the manually extracted type, the tube 40 being utilized, etc.) with the desired way to secure the insert 16 to the substrate 12. Specific details of the different examples to secure the insert 16 to the substrate 12 are discussed below.

Referring to FIGS. 1-6, the fitting 18 may be further defined as a pin 42 having a head 44. Generally, the component 36 is disposed in the opening 20 of the pin 42. Furthermore, the opening 20 of the pin 42 may be closed at one end 46 of the pin 42. As best shown in FIG. 2, part of the component 36 may be disposed in the opening 20 of the pin 42 and another part of the component 36 may be disposed outside of the opening 20 of the pin 42. The pin 42 may be closed at one end 46 to limit how much the component 36 may be inserted into the opening 20 and/or may contain any excess material seepage during the molding process.

In this configuration, the mold 14 may include threads 24C and the pin 42 may include the threads 24A complementary to the threads 24C of the mold 14. The pin 42 and the mold 14 are threaded together via the threads 24A of the pin 42 and the threads 24C of the mold 14. Hence, the pin 42 is secured to the mold 14 before forming the substrate 12. Optionally, a seal may be disposed around the pin 42 to minimize or prevent the material, e.g., the resin, being utilized to form the substrate 12 from entering between the threads 24A, 24C of the pin 42 and the mold 14. Furthermore, optionally, the pin 42 may define a groove proximal to the threads 24A of the pin, and the groove may face the threads 24C of the mold 14. The seal may be disposed in the groove of the pin 42 to seal between the threads 24A, 24C of the pin 42 and the mold 14. One non-limiting example of the seal around the pin 42 includes an o-ring.

As best shown in FIG. 2, the retainer member 38 may be disposed around the component 36 to maintain the position of the component 36 relative to the pin 42 and the insert 16. The retainer member 38 may be disposed between the back wall 32 of the insert 16 and a distal end 48 of the pin 42. The retainer member 38 may be any suitable configuration as discussed above, including either of the configurations of FIGS. 7 and 8. The angled back wall 32 as illustrated in FIGS. 2-6 assists in pinching the retainer member 38 between the back wall 32 and the distal end 48 of the pin 42 to limit seepage of any excess material during the molding process inside the opening 20 of the pin 42.

The insert 16 may include the threads 24B complementary to the threads 24A of the pin 42. The pin 42 and the insert 16 are threaded together via the threads 24A, 24B of the pin 42 and the threads 24B of the insert 16 before forming the substrate 12. Part of the component 36 may be disposed in the hole 34 of the insert 16 and another part of the component 36 may be disposed outside of the hole 34 of the insert 16.

After the insert 16 is assembled to the pin 42, the substrate 12 may be formed in the mold 14. As such, one or more materials are disposed in the mold 14 to form the substrate 12 secured to the component 36 and the insert 16. After the material(s) have cured, hardened, etc., then the part may be removed from the mold 14. To do so, the pin 42 is unscrewed from the mold 14 utilizing the head 44 of the pin 42. Therefore, the head 44 of the pin 42 may be configured to receive a tool, such as a screw driver, a wrench, a socket wrench, automated machine, etc. Once the pin 42 is removed from the mold 14, then the mold 14 may be removed from the substrate 12. Once the substrate 12 is removed from the mold 14, the retainer member 38 may be removed from the component 36. Next, the component 36 may be removed if the component 36 is the sacrificial component discussed above to produce an end part as shown in FIG. 6. Otherwise, if the component 36 is the tube 40, then the tube 40 (shown in phantom lines in FIG. 6) remains secured to the substrate 12 to produce an end part. The insert 16 of the end part may be utilized as a connector to the vascular system, in which a connector line may be threaded thereto to connect fluid flow paths.

Figure 12:
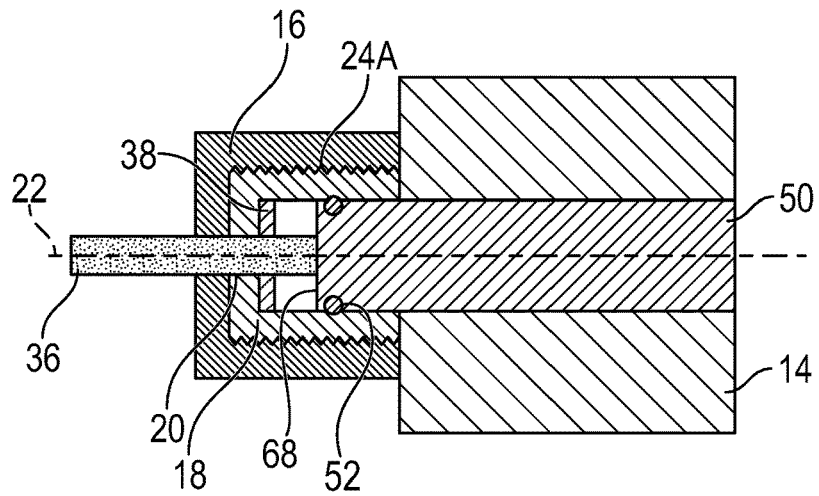
FIG. 12 is a schematic cross-sectional view of the fitting and the insert of FIG. 10 with a ball-lock pin and a mold before forming the substrate.
Figure 13:
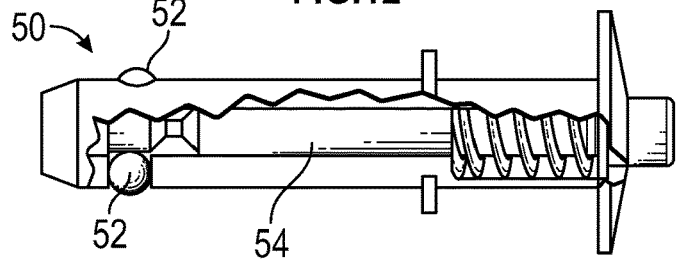
FIG. 13 is a schematic fragmentary side view of the ball-lock pin of FIG. 12.

Referring to FIGS. 9-18, the fitting 18 may be a different configuration than the configuration of FIGS. 1-6. Additionally, the system may further include a ball-lock pin 50 (see FIGS. 12 and 13) coupled to the mold 14. Referring to FIG. 13, the ball-lock pin 50 may be spring biased to allow one or more features 52, such as balls to retract into a shaft 54 of the ball-lock pin 50 and move outwardly partially outside of the shaft 54. The ball-lock pin 50 is movable relative to the mold 14 to selectively engage the fitting 18. The ball-lock pin 50 is coupled to the mold 14 before forming the substrate 12.

Figure 9:
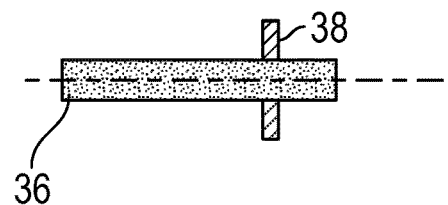
FIG. 9 is a schematic cross-sectional view of the component and one of the retainer members before forming the substrate.

Referring to FIG. 9, the retainer member 38 may be disposed around the component 36 to maintain the position of the component 36 relative to the fitting 18 and the insert 16. The retainer member 38 may be disposed around the component 36 before inserting the component 36 through the fitting 18 and the insert 16.

The insert 16 may include the threads 24B and the fitting 18 may include the threads 24A complementary to the threads 24B of the insert 16. The fitting 18 and the insert 16 are threaded together via the threads 24A, 24B of the fitting 18 and the threads 24B of the insert 16 before forming the substrate 12. More specifically, the fitting 18 may define at least one slot 56 (see FIG. 11). The slot 56 of the fitting 18 is configured to secure the fitting 18 to the insert 16 before the molding process, and configured to remove the fitting 18 from the insert 16 while the insert 16 remains molded to the substrate 12 (i.e., after the substrate 12 has been molded to the insert 16). To do so, the fitting 18 is screwed into the insert 16 and unscrewed from the insert 16 utilizing the slot 56. Therefore, the fitting 18 may be configured to receive a tool, such as a screw driver, a wrench, a socket wrench, automated machine, etc., The fitting 18 may be disposed at least partially inside the cavity 28 of the insert 16. As best shown in FIG. 10, the fitting 18 may define a space 58 configured to receive at least part of the retainer member 38 and the component 36. In certain embodiments, the space 58 may be disposed along the first axis 22. The insert 16 and the fitting 18 may be secured to each other, and separately, the retainer member 38 and the component 36 may be secured to each other, then these two subassemblies may be combined, i.e., the component 36 may be inserted through the hole 34 of the insert 16 and the opening 20 of the fitting 18 such that the retainer member 38 is positioned in the space 58.

The fitting 18 may include an inner wall 60 and a bottom wall 62 transverse to the inner wall 60. The inner wall 60 defines a side boundary 64 of the space 58. The threads 24A of the fitting 18 may be spaced from the space 58 and may face outwardly away from the space 58. The opening 20 of the fitting 18 is defined completely through the bottom wall 62. Part of the component 36 may be disposed in the opening 20 of the fitting 18 and another part of the component 36 may be disposed outside of the opening 20 of the fitting 18. Furthermore, part of the component 36 may be disposed in the hole 34 of the insert 16 and another part of the component 36 may be disposed outside of the hole 34 of the insert 16. The hole 34 of the insert 16 is defined completely through the back wall 32 of the insert 16. In certain embodiments, the retainer member 38 may abut the bottom wall 62 of the fitting 18 inside the space 58. The retainer member 38 may optionally limit seepage of any excess material during the molding process inside the space 58 of the fitting 18.

As best shown in FIG. 10, the fitting 18 may define at least one recess 66. More specifically, the inner wall 60 of the fitting 18 may define the at least one recess 66. It is to be appreciated that more than one recess 66 may be defined by the inner wall 60. The ball-lock pin 50 is coupled to the fitting 18 via the at least one recess 66. In preparation of forming the substrate 12, the ball-lock pin 50 may be extended into the space 58 of the fitting 18 and the features 52, such as the balls, may advance into the respective recess(es) 66, thereby securing the ball-lock pin 50 to the fitting 18, which thus, contains the retainer member 38 in the space 58 between the bottom wall 62 of the fitting 18 and a distal end 68 of the ball-lock pin 50. Furthermore, an end of the component 36 is contained in the space 58 between the bottom wall 62 of the fitting 18 and the distal end 68 of the ball-lock pin 50.

Figure 15:
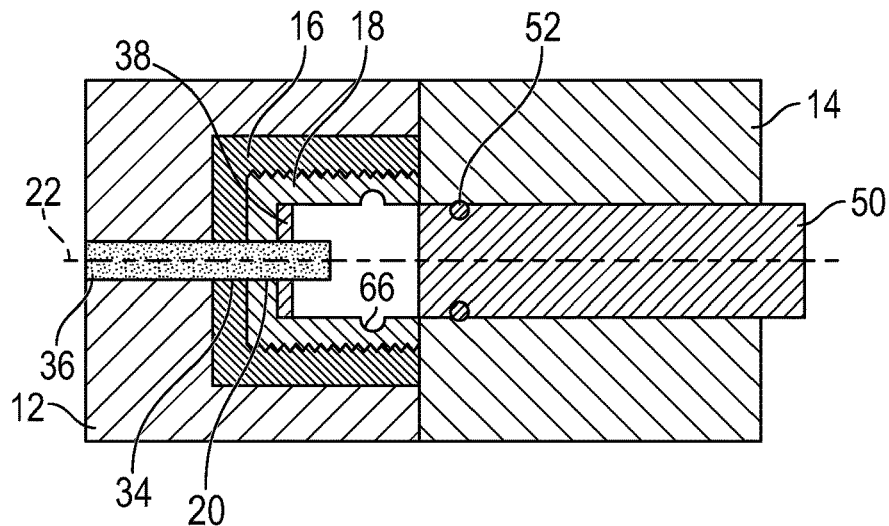
FIG. 15 is a schematic cross-sectional view of an optional step of retracting the ball-lock pin of FIG. 13 from the fitting after forming the substrate.
Figure 16:
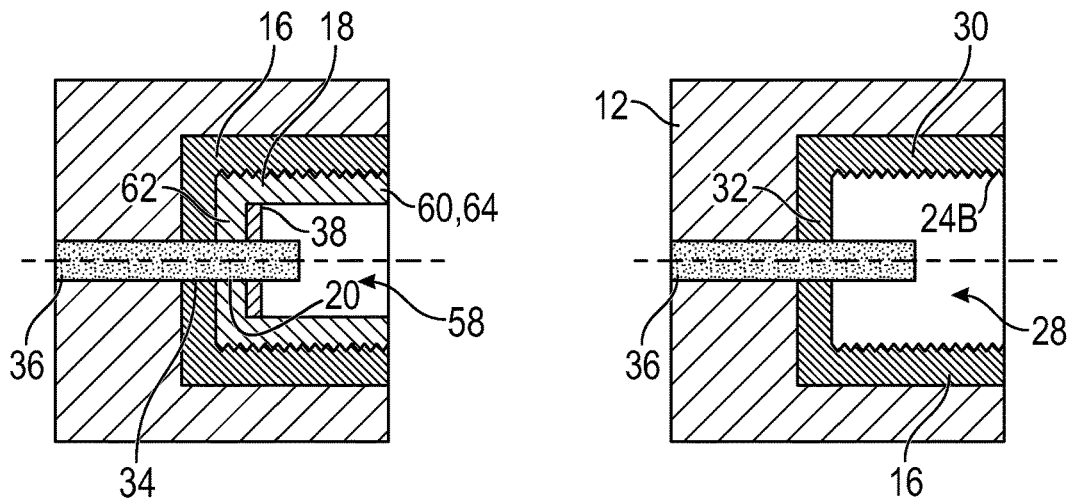
FIG. 16 is a schematic cross-sectional view of the substrate removed from the mold.

After the ball-lock pin 50 is assembled to the fitting 18, the substrate 12 may be formed in the mold 14. As such, one or more materials are disposed in the mold 14 to form the substrate 12 secured to the component 36 and the insert 16. After the material(s) have cured, hardened, etc., then the part may be removed from the mold 14. To do so, if the ball-lock pin 50 is positioned vertically (turned 90 degrees relative to the first axis 22 in FIG. 15), the ball-lock pin 50 is activated to move the shaft 54 which allows the features 52, such as the balls, to retract from the recess(es) 66. Then, the ball-lock pin 50 may be removed from the space 58 of the fitting 18 and the substrate 12 may be removed from the mold 14. If the ball-lock pin 50 is positioned horizontally as shown in FIG. 15, then the ball-lock pin 50 does not have to be retracted from the fitting 18 to remove the fitting 18 and the substrate 12 from the mold 14.

Regardless of the orientation of the ball-lock pin 50, after the substrate 12 is formed, the fitting 18 is unscrewed from the insert 16 utilizing the slot 56. In certain embodiments, the retainer member 38 may slip off the end of the component 36 as the fitting 18 is unscrewed from the insert 16. Alternatively, the retainer member 38 may be removed from the component 36 separately and then the fitting 18 unscrewed from the insert 16 utilizing the slot 56. Next, the component 36 may be removed if the component 36 is the sacrificial component discussed above to produce an end part as shown in FIG. 18. Otherwise, if the component 36 is the tube 40, then the tube 40 (shown in phantom lines in FIG. 18) remains secured to the substrate 12 to produce an end part. The insert 16 of the end part may be utilized as a connector to the vascular system, in which a connector line may be threaded thereto to connect fluid flow paths.

As discussed above, the component 36 may be defined as the tube 40, which may be utilized in the configurations of FIGS. 1-6 and 9-18. In this configuration, the component 36 is not removed from the substrate 12. As such, part of the tube 40 may be disposed in the opening 20 of the fitting 18, and the tube 40 remains molded to the substrate 12 to form the at least one channel 10 in the substrate 12. Furthermore, part of the tube 40 may be disposed in the hole 34 of the insert 16 and another part of the tube 40 may be disposed outside of the hole 34 of the insert 16. Hence, the tube 40 also remains secured to the insert 16 via the substrate 12. The retainer member 38 may be disposed around the tube 40 to maintain the position of the tube 40 relative to the fitting 18 and the insert 16. The above discussions of the retainer member 38, as well as the pin 42, the ball-lock pin 50, apply to the tube 40 configuration, and will not be repeated. The insert 16 of the end part may be utilized as a connector to the vascular system, in which a connector line may be threaded thereto to connect the tube 40 with fluid flow paths.

The present disclosure also includes a method of forming the at least one channel 10 within the substrate 12. The method also includes coupling the fitting 18 to the mold 14, and securing together the fitting 18 and the insert 16 via threads 24A, 24B. The method further includes inserting the component 36 into the opening 20 of the fitting 18. As discussed above, part of the component 36 is disposed outside of the opening 20 of the fitting 18, and the component 36 is utilized to define the at least one channel 10 within the substrate 12. The method may include placing the retainer member 38 around the component 36 to maintain the position of the component 36 relative to the fitting 18 and the insert 16. The method may also include inserting the component 36 through the hole 34 of the insert 16. As discussed above, part of the component 36 is disposed outside of the hole 34 of the insert 16.

Additionally, the method includes molding at least one material to the component 36 and the insert 16 to form the substrate 12. In certain embodiments, molding the at least one material to the component 36 and the insert 16 may further include molding the at least one material directly to the component 36 and the insert 16 to form the substrate 12.

The method also includes removing the fitting 18 from the insert 16 while the insert 16 remains molded to the substrate 12. Removing the fitting 18 from the insert 16 may occur after molding the at least one material to the component 36 and the insert 16. The method may include removing the retainer member 38 from the component 36 after molding the at least one material to the component 36 and the insert 16.

The above discussion of the method in the three paragraphs immediately above applies to all of the embodiments, and below additional details of each of the embodiments are discussed for illustrative purposes.

Referring to FIGS. 1-6, the fitting 18 is further defined as the pin 42 having the head 44 and the opening 20 of the pin 42 is closed at one end 46 of the pin 42. In this configuration, coupling the fitting 18 to the mold 14 may further include threading the pin 42 to threads 24C of the mold 14. Furthermore, inserting the component 36 into the opening 20 of the fitting 18 may further include inserting the component 36 into the opening 20 of the pin 42. In certain embodiments, threading the pin 42 to the mold 14 may occur before inserting the component 36 into the opening 20 of the pin 42. In other embodiments, the component 36 may be inserted into the opening 20 of the pin 42 before threading the pin 42 to the mold 14.

In this embodiment, securing together the fitting 18 and the insert 16 via the threads 24A, 24B may further include securing together the pin 42 and the insert 16 via the threads 24A, 24B. Generally, securing together the pin 42 and the insert 16 via the threads 24A, 24B occurs after threading the pin 42 to the threads 24C of the mold 14.

Furthermore, in certain embodiments, inserting the component 36 into the opening 20 of the pin 42 occurs before inserting the component 36 through the hole 34 of the insert 16. The method may further include placing the retainer member 38 around the component 36 to maintain the position of the component 36 relative to the pin 42 and the insert 16. The retainer member 38 is compressed between the back wall 32 of the insert 16 and the distal end 48 of the pin 42. Placing the retainer member 38 around the component 36 may occur before molding the at least one material to the component 36 and the insert 16. Furthermore, in certain embodiments, the retainer member 38 may be placed around the component 36 before threading together the insert 16 and the pin 42, thus positioning the component 36 in the desired location before placing the insert 16.

After the insert 16 is threaded to the pin 42 as shown in FIG. 2, the molding process is performed. Hence, the at least one material is molded to the component 36 and the insert 16 to form the substrate 12. After the material(s) have cured, harden, etc., the end part is removed from the mold 14, as set forth below.

The method may further include unscrewing the pin 42 from the mold 14 via the head 44, and removing the fitting 18 from the insert 16 while the insert 16 remains molded to the substrate 12 may further include unscrewing the pin 42 from the insert 16 via the head 44. Unscrewing the pin 42 from the mold 14 occurs after molding the at least one material to the component 36 and the insert 16. Additionally, unscrewing the pin 42 from the insert 16 occurs after molding the at least one material to the component 36 and the insert 16. Next, the substrate 12 with the component 36, the insert 16 and the retainer member 38 may be removed from the mold 14.

The method may also include removing the retainer member 38 from the component 36 after molding the at least one material to the component 36 and the insert 16, and removing the component 36 from the hole 34 of the insert 16 and the substrate 12, thereby forming the at least one channel 10 in the substrate 12. Generally, removing the component 36 from the hole 34 of the insert 16 and the substrate 12 may occur after unscrewing the pin 42 from the mold 14 and unscrewing the pin 42 from the insert 16.

Removing the component 36 from the hole 34 of the insert 16 and the substrate 12 may be performed in any suitable way, and non-limiting examples include where the component 36 is further defined as the sacrificial component. As such, in certain embodiments, removing the component 36 from the substrate 12 may further include igniting the sacrificial component to cause deflagration of the sacrificial component, thereby forming the at least one channel 10 in the substrate 12. In other embodiments, removing the component 36 from the substrate 12 may further include melting the sacrificial component and removing the melted sacrificial component from the substrate 12, thereby forming the at least one channel 10 in the substrate 12.

Referring to FIGS. 9, 10, 12, and 14-18, the method may further include coupling the ball-lock pin 50 to the mold 14. The ball-lock pin 50 is movable relative to the mold 14. As such, the ball-lock pin 50 selectively engages the fitting 18. Therefore, coupling the fitting 18 to the mold 14 may further include coupling the ball-lock pin 50 to the fitting 18 via the at least one recess 66 of the fitting 18, and more specifically via the feature(s) 52. Coupling the ball-lock pin 50 to the fitting 18 may occur after coupling the ball-lock pin 50 to the mold 14.

In certain embodiments, inserting the component 36 through the hole 34 of the insert 16 and inserting the component 36 into the opening 20 of the fitting 18 may occur before coupling the ball-lock pin 50 to the fitting 18. Furthermore, placing the retainer member 38 around the component 36 may occur before molding the at least one material to the component 36 and the insert 16. Additionally, placing the retainer member 38 around the component 36 may occur before inserting the component 36 through the hole 34 of the insert 16 and the opening 20 of the fitting 18. Therefore, the retainer member 38 and the component 36 may be preassembled, and separately, the fitting 18 and the insert 16 may be preassembled. Then, the two sub-assemblies may be assembled together. Hence, the component 36 may be inserted through the opening 20 of the fitting 18 via the space 58, and the component 36 continues to move through the space 58 until the retainer member 38 abuts the bottom wall 62 of the fitting 18.

Once the ball-lock pin 50 engages the fitting 18 and the component 36 is disposed through the insert 16 and the fitting 18 as shown in FIG. 12, the molding process is performed. Hence, the at least one material is molded to the component 36 and the insert 16 to form the substrate 12. After the material(s) have cured, harden, etc., the end part is removed from the mold 14, as set forth below.

To remove the substrate 12 from the mold 14, if the ball-lock pin 50 is positioned vertically (turned 90 degrees relative to the first axis 22 in FIG. 15), the ball-lock pin 50 is activated to move the shaft 54 which allows the features 52, such as the balls, to retract from the recess(es) 66. Then, the ball-lock pin 50 may be removed from the space 58 of the fitting 18 and the substrate 12 may be removed from the mold 14. If the ball-lock pin 50 is positioned horizontally as shown in FIG. 15, then the ball-lock pin 50 does not have to be retracted from the fitting 18 to remove the fitting 18 and the substrate 12 from the mold 14.

Next, the fitting 18 and the retainer member 38 will be removed. As such, removing the fitting 18 from the insert 16 while the insert 16 remains molded to the substrate 12 may further include unscrewing the fitting 18 from the insert 16 via the at least one slot 56 of the fitting 18. Hence, unscrewing the fitting 18 from the insert 16 may occur after molding the at least one material to the component 36 and the insert 16, and furthermore, removing the retainer member 38 from the component 36 may occur after molding the at least one material to the component 36 and the insert 16. The retainer member 38 is removed from the space 58 and from the component 36.

The method may also include removing the component 36 from the hole 34 of the insert 16 and the substrate 12, thereby forming the at least one channel 10 in the substrate 12. Generally, removing the component 36 from the hole 34 of the insert 16 and the substrate 12 may occur after unscrewing the fitting 18 from the insert 16.

Removing the component 36 from the hole 34 of the insert 16 and the substrate 12 may be performed in any suitable way, and non-limiting examples include where the component 36 is further defined as the sacrificial component. As such, in certain embodiments, removing the component 36 from the substrate 12 may further include igniting the sacrificial component to cause deflagration of the sacrificial component, thereby forming the at least one channel 10 in the substrate 12. In other embodiments, removing the component 36 from the substrate 12 may further include melting the sacrificial component and removing the melted sacrificial component from the substrate 12, thereby forming the at least one channel 10 in the substrate 12.

Figure 6:
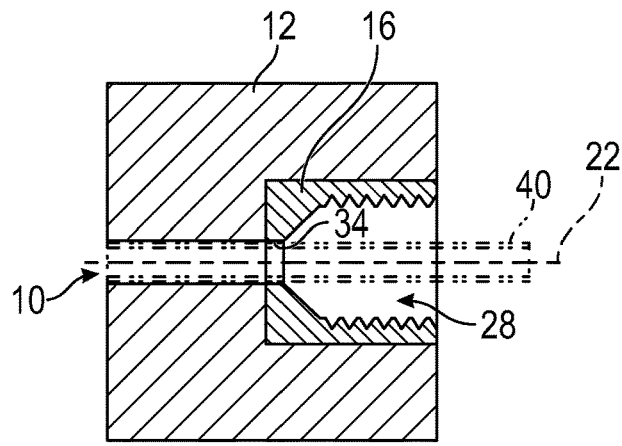
FIG. 6 is a schematic fragmentary cross-sectional view of an end part created via FIGS. 1-5.
Figure 18:
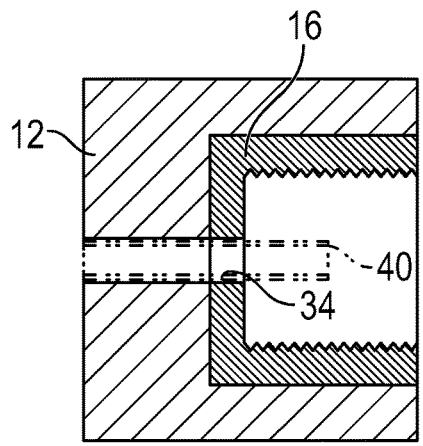
FIG. 18 is a schematic cross-sectional view of an end part created via FIGS. 9, 10, 12 and 14-17.

Referring to FIGS. 6 and 18, the component 36 may be further defined as the tube 40. Hence, the tube 40 is used instead of the sacrificial component. Therefore, the component 36 is not removed from the end part. The tube 40 may be utilized in the configurations of FIGS. 1-6 and 9-18, and for illustrative purposes only, the tube 40 is shown in phantom lines in FIGS. 6 and 18. Therefore, the discussion above for FIGS. 1-6 and 9-18 applies to the tube 40 configuration, except for the sacrificial component being removed from the substrate 12.

Briefly, some of the method for the tube 40 are discussed below. In this embodiment, inserting the component 36 into the opening 20 of the fitting 18 may further include inserting the tube 40 into the opening 20 of the fitting 18. Molding the at least one material to the component 36 and the insert 16 may further include molding the at least one material to the tube 40 and the insert 16 to form the substrate 12, and the tube 40 remains molded to the substrate 12 to form the at least one channel 10 in the substrate 12. The tube 40 is inserted through the hole 34 of the insert 16, and part of the tube 40 is disposed outside of the hole 34 of the insert 16. The retainer member 38 is placed around the tube 40 to maintain the position of the tube 40 relative to the fitting 18 and the insert 16. Placing the retainer member 38 around the tube 40 may occur before molding the at least one material to the component 36 and the insert 16.

After the molding process is performed, the end part is removed from the mold 14. Hence, removing the retainer member 38 from the tube 40 occurs after molding the at least one material to the tube 40 and the insert 16. Therefore, again, the tube 40 remains secured to the substrate 12, and thus, part of the end part.

It is to be appreciated that the order or sequence of performing the method discussed and illustrated herein is for illustrative purposes and other orders, steps or sequences are within the scope of the present teachings, some of which have been discussed above.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration may be combined with one or a plurality of other desired characteristics from other configurations, resulting in other configurations not described in words or by reference to the drawings. Accordingly, such other configurations fall within the framework of the scope of the appended claims.

What is claimed is:

1. A method of forming at least one channel within a substrate, the method comprising:
coupling a fitting to a mold;
securing together the fitting and an insert via threads;
inserting a component into an opening of the fitting, wherein part of the component is disposed outside of the opening of the fitting, and the component is utilized to form the at least one channel within the substrate;
molding at least one material to the component and the insert to form the substrate; and
removing the fitting from the insert while the insert remains molded to the substrate.

2. The method as set forth in claim 1 wherein molding the at least one material to the component and the insert further comprises molding the at least one material directly to the component and the insert to form the substrate.

3. The method as set forth in claim 2 further comprising inserting the component through a hole of the insert, wherein part of the component is disposed outside of the hole of the insert.

4. The method as set forth in claim 3 further comprising removing the component from the hole of the insert.

5. The method as set forth in claim 1 further comprising placing a retainer member around the component to maintain a position of the component relative to the fitting and the insert.

6. The method as set forth in claim 5 further comprising removing the retainer member from the component after molding the at least one material to the component and the insert.

7. The method as set forth in claim 1 further comprising removing the component from the substrate, thereby forming the at least one channel in the substrate.

8. The method as set forth in claim 7 wherein the component is further defined as a sacrificial component, wherein removing the component from the substrate further comprises igniting the sacrificial component to cause deflagration of the sacrificial component, thereby forming the at least one channel in the substrate.

9. The method as set forth in claim 7 wherein the component is further defined as a sacrificial component, wherein removing the component from the substrate further comprises melting the sacrificial component and removing the melted sacrificial component from the substrate, thereby forming the at least one channel in the substrate.

10. The method as set forth in claim 1:
wherein the fitting is further defined as a pin having a head and the opening of the pin is closed at one end of the pin;
wherein coupling the fitting to the mold further comprises threading the pin to threads of the mold;
wherein inserting the component into the opening of the fitting further comprises inserting the component into the opening of the pin;
wherein securing together the fitting and the insert via the threads further comprises securing together the pin and the insert via the threads;
wherein securing together the pin and the insert via the threads occurs after threading the pin to the threads of the mold;
further comprising inserting the component through a hole of the insert, wherein part of the component is disposed outside of the hole of the insert;
wherein inserting the component into the opening of the pin occurs before inserting the component through the hole of the insert;
further comprising placing a retainer member around the component to maintain a position of the component relative to the pin and the insert;
wherein placing the retainer member around the component occurs before molding the at least one material to the component and the insert;
further comprising unscrewing the pin from the mold via the head;
wherein unscrewing the pin from the mold occurs after molding the at least one material to the component and the insert;
wherein removing the fitting from the insert while the insert remains molded to the substrate further comprises unscrewing the pin from the insert via the head;
further comprising removing the retainer member from the component after molding the at least one material to the component and the insert;
further comprising removing the component from the hole of the insert and the substrate, thereby forming the at least one channel in the substrate; and
wherein removing the component from the hole of the insert and the substrate occurs after unscrewing the pin from the mold and unscrewing the pin from the insert.

11. The method as set forth in claim 1:
further comprising coupling a ball-lock pin to the mold;
wherein coupling the fitting to the mold further comprises coupling the ball-lock pin to the fitting via at least one recess of the fitting;
wherein coupling the ball-lock pin to the fitting occurs after coupling the ball-lock pin to the mold;
further comprising inserting the component through a hole of the insert, wherein part of the component is disposed outside of the hole of the insert;
wherein inserting the component through the hole of the insert and inserting the component into the opening of the fitting occurs before coupling the ball-lock pin to the fitting;
further comprising placing a retainer member around the component to maintain a position of the component relative to the fitting and the insert;
wherein placing the retainer member around the component occurs before molding the at least one material to the component and the insert;
wherein placing the retainer member around the component occurs before inserting the component through the hole of the insert and the opening of the fitting;
wherein removing the fitting from the insert while the insert remains molded to the substrate further comprises unscrewing the fitting from the insert via at least one slot of the fitting;

wherein unscrewing the fitting from the insert occurs after molding the at least one material to the component and the insert;

further comprising removing the retainer member from the component after molding the at least one material to the component and the insert;

further comprising removing the component from the hole of the insert and the substrate, thereby forming the at least one channel in the substrate; and wherein removing the component from the hole of the insert and the substrate occurs after unscrewing the fitting from the insert.

12. The method as set forth in claim 1:

wherein the component is further defined as a tube;

wherein inserting the component into the opening of the fitting further comprises inserting the tube into the opening of the fitting;

wherein molding the at least one material to the component and the insert further comprises molding the at least one material to the tube and the insert to form the substrate, and the tube remains molded to the substrate to form the at least one channel in the substrate;

further comprising inserting the tube through a hole of the insert, wherein part of the tube is disposed outside of the hole of the insert;

further comprising placing a retainer member around the tube to maintain a position of the tube relative to the fitting and the insert;

wherein placing the retainer member around the tube occurs before molding the at least one material to the component and the insert;

wherein removing the fitting from the insert while the insert remains molded to the substrate further comprises unscrewing the fitting from the insert;

wherein unscrewing the fitting from the insert occurs after molding the at least one material to the tube and the insert; and further comprising removing the retainer member from the tube after molding the at least one material to the tube and the insert.

13. A system comprising:

a mold configured to form a substrate;

a fitting coupled to the mold, and the fitting defines an opening;

an insert and the fitting secured together via threads;

a component inserted into the opening of the fitting, wherein part of the component is disposed outside of the opening of the fitting, and the component is utilized to form define at least one channel within the substrate;

wherein the component and the insert are disposed inside the mold, and at least one material is disposed inside the mold to form the substrate secured to the component and the insert;

wherein the fitting is removed from the insert while the insert remains molded to the substrate; and wherein the insert defines a hole, wherein part of the component is disposed in the hole of the insert and another part of the component is disposed outside of the hole of the insert.

14. The system as set forth in claim 13 further including a retainer member disposed around the component to maintain a position of the component relative to the fitting and the insert.

15. The system as set forth in claim 13 wherein the component is further defined as a sacrificial component, wherein the sacrificial component is ignited to cause deflagration of the sacrificial component, thereby forming the at least one channel in the substrate.

16. The system as set forth in claim 13 wherein the component is further defined as a sacrificial component, wherein the sacrificial component is melted to remove from the substrate, thereby forming the at least one channel in the substrate.

17. The system as set forth in claim 13:

wherein the fitting is further defined as a pin having a head and the opening of the pin is closed at one end of the pin, wherein part of the component is disposed in the opening of the pin;

wherein the mold includes threads and the pin includes threads complementary to the threads of the mold, wherein the pin and the mold are threaded together via the threads of the pin and the threads of the mold;

wherein the insert includes threads complementary to the threads of the pin, wherein the pin and the insert are threaded together via the threads of the pin and the threads of the insert; and further including a retainer member disposed around the component to maintain a position of the component relative to the pin and the insert.

18. The system as set forth in claim 13:

further including a ball-lock pin coupled to the mold;

wherein the insert includes threads and the fitting includes threads complementary to the threads of the insert, wherein the fitting and the insert are threaded together via the threads of the fitting and the threads of the insert;

wherein the fitting defines at least one recess, and the ball-lock pin is coupled to the fitting via the at least one recess;

further including a retainer member disposed around the component to maintain a position of the component relative to the fitting and the insert; and wherein the fitting defines at least one slot configured to remove the fitting from the insert while the insert remains molded to the substrate.

19. The system as set forth in claim 13:

wherein the component is further defined as a tube, wherein part of the tube is disposed in the opening of the fitting, and the tube remains molded to the substrate to form the at least one channel in the substrate;

wherein part of the tube is disposed in the hole of the insert and another part of the tube is disposed outside of the hole of the insert; and further including a retainer member disposed around the tube to maintain a position of the tube relative to the fitting and the insert.

20. A method of forming at least one channel within a substrate, the method comprising:

coupling a fitting to a mold;

securing together the fitting and an insert via threads;

inserting a component into an opening of the fitting, wherein part of the component is disposed outside of the opening of the fitting, and the component is utilized to define the at least one channel within the substrate;

molding at least one material directly to the component and the insert;

inserting the component through a hole of the insert, wherein part of the component is disposed outside of the hole of the insert;

removing the fitting from the insert while the insert remains molded to the substrate; and removing the component from the substrate, thereby forming the at least one channel in the substrate.

\* \* \* \* \*